United States Patent
Lim et al.

(10) Patent No.: US 7,299,048 B2
(45) Date of Patent: Nov. 20, 2007

(54) SYSTEM AND METHOD FOR PERFORMING SOFT HANDOVER IN BROADBAND WIRELESS ACCESS COMMUNICATION SYSTEM

(75) Inventors: Geun-Hwi Lim, Seongnam-si (KR); Jae-Jeong Shim, Seoul (KR); Hong-Sung Chang, Suwon-si (KR); Yong Chang, Seongnam-si (KR); Jung-Won Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 52 days.

(21) Appl. No.: 11/166,012

(22) Filed: Jun. 24, 2005

(65) Prior Publication Data
US 2005/0288028 A1     Dec. 29, 2005

(30) Foreign Application Priority Data
Jun. 25, 2004  (KR) .................. 10-2004-0048566

(51) Int. Cl.
*H04Q 7/20* (2006.01)
(52) U.S. Cl. ......................... 455/442; 455/436
(58) Field of Classification Search ................ 455/436, 455/437, 439, 442, 445, 450, 451, 452.2; 370/329, 331, 335
See application file for complete search history.

(56) References Cited

U.S. PATENT DOCUMENTS

| | | | |
|---|---|---|---|
| 5,956,641 A * | 9/1999 | Bruckert et al. | 455/442 |
| 6,295,452 B1 * | 9/2001 | Choi | 455/436 |
| 6,341,222 B1 * | 1/2002 | Neumiller et al. | 455/422.1 |
| 2002/0045451 A1 * | 4/2002 | Hwang et al. | 455/442 |
| 2003/0032431 A1 * | 2/2003 | Chang | 455/438 |
| 2004/0116143 A1 | 6/2004 | Love et al. | |
| 2004/0176094 A1 * | 9/2004 | Kim et al. | 455/438 |

FOREIGN PATENT DOCUMENTS

JP        2000-278734       10/2000

\* cited by examiner

*Primary Examiner*—Jean Gelin
(74) *Attorney, Agent, or Firm*—The Farrell Law Firm (57) ABSTRACT

Disclosed is a system and method for performing soft handover in a broadband wireless access communication system. An anchor base station transmits first information including channel assignment information of an active non-anchor base station when it is determined that a mobile station is to perform the soft handover, and when there are signals to be transmitted to the mobile station from the non-anchor base station, the non-anchor base station transmits second information including channel assignment information of the anchor base station when it is determined that the mobile station is to perform the soft handover, and when there are signals to be transmitted to the mobile station from the anchor base station, and the mobile station receives signals from the anchor base station and the non-anchor base station corresponding to the first information and the second information when it is determined that the mobile station is to perform the soft handover.

24 Claims, 10 Drawing Sheets

| Syntax | Size | Notes |
|---|---|---|
| DL-MAP_Message_format() { | | |
| Management Message Type = 2 | 8 bits | |
| PHY Synchronization Field | Variable | See appropriate PHY specification |
| DCD Count | 8 bits | |
| Base Station ID | 48 bits | |
| Begin PHY Specific Section { | | See appropriate PHY section |
| for(i=1;i<n;i++) { | | For each DL-MAP element 1 to n |
| DL-MAP_IE() | Variable | See corresponding PHY specification |
| } | | |
| } | | |
| if!(byte boundary) { | | |
| Padding Nibble | 4 bits | Padding to each byte boundary |
| } | | |
| } | | |

FIG.4

| Syntax | Size | Notes |
|---|---|---|
| UL-MAP_Message_format() { | | |
| Management Message Type = 3 | 8 bits | |
| Uplink Channel ID | 8 bits | |
| UCD Count | 8 bits | |
| Allocation Start Time | 32 bits | |
| Begin PHY Specific Section { | | See appropriate PHY section |
| for(i=1;f<n;i++) { | | For each UL-MAP element 1 to n |
| UL-MAP_IE() | Variable | See corresponding PHY specification |
| } | | |
| } | | |
| if!(byte boundary) { | | |
| Padding Nibble | 4 bits | Padding to each byte boundary |
| } | | |
| } | | |

FIG.5

| Syntax | Size | Notes |
|---|---|---|
| HO Anchor Active DL MAP IE() { | | |
| Extended DIUC | 4 bits | HO Anchor Active DL MAP IE |
| Length | 4 bits | Length of this IE in Bytes |
| for (each burst) { | | |
| Anchor Preamble | 8 bits | Preamble of Anchor BS |
| Anchor CID | 16 bits | basic CID in Anchor BS |
| DIUC | 4 bits | |
| OFDMA Symbol offset | 8 bits | |
| Subchannel offset | 6 bits | |
| Boosting | 3 bits | |
| No. OFDMA Symbols | 7 bits | |
| No. Subchannels | 6 bits | |
| Repetition Coding Indication | 2 bits | |
| } | | |
| } | | |

FIG.6

| Syntax | Size | Notes |
| --- | --- | --- |
| HO DL MAP IE in Non-Anchor BS() { | | |
| Extended DIUC | 4 bits | HO DL MAP IE in Non-Anchor BS |
| Length | 4 bits | Length of this IE in Bytes |
| for (each burst) { | | |
| Non-Anchor Preamble | 8 bits | Preamble of Active Non-Anchor BS |
| Anchor CID | 16 bits | basic CID in Anchor BS |
| DIUC | 4 bits | |
| OFDMA Symbol offset | 8 bits | |
| Subchannel offset | 6 bits | |
| Boosting | 3 bits | |
| No. OFDMA Symbols | 7 bits | |
| No. Subchannels | 6 bits | |
| Repetition Coding Indication | 2 bits | |
| } | | |
| } | | |

FIG.7

| Syntax | Size | Notes |
|---|---|---|
| HO CID Translation MAP IE () { | | |
| Extended DIUC | 4 bits | HO CID Translation MAP IE |
| Length | 4 bits | Length of this IE in Bytes |
| for (each burst) { | | |
| Anchor Preamble | 8 bits | Preamble of Anchor BS |
| Anchor CID | 16 bits | |
| Non-Anchor CID | 16 bits | |
| } | | |
| } | | |

FIG.8

| Syntax | Size | Notes |
|---|---|---|
| HO Anchor UL MAP IE() { | | |
| Extended DIUC | 4 bits | HO Anchor UL MAP IE |
| Length | 4 bits | Length of this IE in Bytes |
| for (each burst) { | | |
| Anchor Preamble | 8 bits | Preamble of Anchor BS |
| Anchor CID | 16 bits | |
| UIUC | 4 bits | |
| Start subchannel offset | 12 bits | |
| Duration | 10 bits | |
| Repetition Coding Indication | 2 bits | |
| } | | |
| } | | |

FIG.9

| Syntax | Size | Notes |
|---|---|---|
| HO UL MAP IE in Non-Anchor BS() { | | |
| Extended DIUC | 4 bits | HO UL MAP IE in Non-Anchor BS |
| Length | 4 bits | Length of this IE in Bytes |
| for (each burst) { | | |
| Non-Anchor Preamble | 8 bits | Preamble of Active Non-Anchor BS |
| Anchor CID | 16 bits | |
| UIUC | 4 bits | |
| Start subchannel offset | 12 bits | |
| Duration | 10 bits | |
| Repetition Coding Indication | 2 bits | |
| } | | |
| } | | |

SYSTEM AND METHOD FOR PERFORMING SOFT HANDOVER IN BROADBAND WIRELESS ACCESS COMMUNICATION SYSTEM

PRIORITY

This application claims priority under 35 U.S.C. § 119 to an application entitled "System and Method for Performing Soft Handover in Broadband Wireless Access Communication System" filed in the Korean Intellectual Property Office on Jun. 25, 2004 and assigned Serial No. 2004-48566, the contents of which are incorporated herein by reference.

BACKGROUND OF THE INVENTION

1. Field of the Invention

The present invention relates to a broadband wireless access (BWA) communication system, and more particularly to a system and a method for performing a soft handover.

2. Description of the Related Art

In the $4^{th}$ generation (4G) communication system, which is the next generation communication system, extensive research is being conducted to provide users with services having various Qualities-of-Service (QoSs) at high speeds. In the current 4G communication system, extensive research is being conducted to develop a new type of communication system ensuring the mobility of a mobile station (MS) and a QoS in a BWA communication system such as a wireless Local Area Network (LAN) system and a wireless Metropolitan Area Network (MAN) system capable of supporting relatively high transmission speeds. Representatives of such communication systems are the Institute of Electrical and Electronics Engineers (IEEE) 802.16a communication system and the IEEE 802.16e communication system.

The IEEE 802.16a/d-based communication system and the IEEE 802.16e-based communication system use an orthogonal frequency division multiplexing (OFDM)/orthogonal frequency division multiple access (OFDMA) scheme for a physical channel of the WMAN system in order to support a broadband transmission network. The IEEE 812.16a communication system is a single structure system that does not reflect the mobility of a Subscriber Station (SS) at all, in which the SS is in a stationary state. In contrast, the IEEE 812.16e-based communication system is a system realized by supplementing the IEEE 812.16a-based communication system with the ability to handle the mobility of an SS. Hereinafter, a mobile SS will be referred to as a MS. Accordingly, in the IEEE 812.16e-based communication system, the study of handover according to the mobility of the MS is being activated.

Handover refers to an operation enabling smooth provision of services to an MS which is moving between base stations (BSs). Such handover may have two schemes (a hard handover scheme and a soft handover scheme). The hard handover scheme and the soft handover scheme will be described.

The hard handover scheme denotes a scheme through which, when an MS moves between base stations, the MS releases a channel setup with an anchor base station (a serving base station currently providing a service to the MS) and sets up a channel with an active non-anchor base station (a target base station) in the shortest period of time, so that the service may be continuously provided. The serving base and the target base station will be referred to as an anchor base station and an active non-anchor base station, respectively, for the purpose of description. The hard handover causes a ping-pong phenomenon of continuously alternating channel release and setup when channel states are continuously inferior, for example, when the MS moves across a cell boundary region.

The soft handover scheme denotes a scheme through which, when an MS moves between base stations, the MS has channels set up with both an anchor base station and an active non-anchor base station, is relocated in the non-anchor base station while simultaneously receiving signals from both the anchor base station and the non-anchor base station through the setup channel, and then releases the channel from the anchor base station, so that the service is continuously provided. Accordingly, when the MS performs a handover operation through the soft handover scheme, the MS receives downlink signals from a plurality of base stations (i.e. the anchor base station and the non-anchor base station) and improves quality of the received downlink signals by combining the downlink signals received from the base stations.

The signal combining scheme may be classified into a soft combining scheme and a selection diversity scheme.

The soft combining scheme is a scheme of demodulating each of the signals received from a plurality of base stations and combining the signals in a front end of a channel decoder. The selection diversity scheme is a scheme of de-modulating and channel-decoding each of the signals received from a plurality of base stations and then selecting a signal with the best quality from among the channel-decoded signals.

The MS performing a handover operation through the soft handover scheme may obtain a soft combining gain by simultaneously receiving signals through channels set up with both the anchor base station and the non-anchor base station. In order to obtain the combining gain, the MS must receive information regarding channels (channel allocation information) set up with both the anchor base station and the non-anchor base station and receive signals from the anchor base station and the non-anchor base station using the channel allocation information.

However, in the typical broadband wireless access system (e.g., the IEEE 812.16e-based communication system), it is difficult for the MS to receive channel allocation information of an active non-anchor base station because an anchor base station reports only information regarding a channel allocated by the anchor base station.

SUMMARY OF THE INVENTION

Accordingly, the present invention has been made to solve at least the above-mentioned problems occurring in the prior art, and an object of the present invention is to provide a system and a method for performing a soft handover in a broadband wireless access communication system.

Another object of the present invention is to provide a system and a method for providing channel allocation information used for performing a soft handover in a broadband wireless access communication system.

Still another object of the present invention is to provide a system and a method in which an anchor base station informs a mobile station of channel allocation information of an active non-anchor base station in a broadband wireless access communication system.

Yet another object of the present invention is to provide a system and a method in which an active non-anchor base station informs a mobile station of channel allocation information of an anchor base station in a broadband wireless access communication system.

To accomplish the above objects, there is provided a method for performing a soft handover in a broadband wireless access communication system which includes a mobile station, an anchor base station providing communication services to the mobile station, and an active non-anchor base station different from the anchor base station, the soft handover of the MS scheduled to be performed toward the active non-anchor base station. The method comprises the steps of: receiving first information from the anchor base station or receiving second information considering channel state from the active non-anchor base station when it is determined that the mobile station is to perform the soft handover, the first information including channel assignment information of the active non-anchor base station, the second information including channel assignment information of the anchor base station; and receiving signals from the anchor base station or the active non-anchor base station corresponding to the first information and the second information.

According to another aspect of the present invention, there is provided a method for performing a soft handover in a broadband wireless access communication system which includes a mobile station, an anchor base station providing communication services to the mobile station, and an active non-anchor base station different from the anchor base station, the soft handover of the MS scheduled to be performed toward the active non-anchor base station. The method comprises the steps of: determining if there are signals to be transmitted to the mobile station from the active non-anchor base station when it is determined that the mobile station is to perform a soft handover; and transmitting information including channel assignment information of the active non-anchor base station when it is determined that there are signals to be transmitted to the mobile station from the active non-anchor base station.

According to still another aspect of the present invention, there is provided a method for performing a soft handover in a broadband wireless access communication system which includes a mobile station, an anchor base station providing communication services to the mobile station, and an active non-anchor base station different from the anchor base station, the soft handover of the MS scheduled to be performed toward the active non-anchor base station. The method comprises the steps of: determining if there are signals to be transmitted to the mobile station from the anchor base station when it is determined that the mobile station is to perform a soft handover; and transmitting first information including channel assignment information of the anchor base station when it is determined that there are signals to be transmitted to the mobile station from the anchor base station.

According to still yet another aspect of the present invention, there is provided a method for performing a soft handover in a broadband wireless access communication system which includes a mobile station, an anchor base station providing communication services to the mobile station, and an active non-anchor base station different from the anchor base station, the soft handover of the MS scheduled to be performed toward the active non-anchor base station. The method comprises the steps of: transmitting by the anchor base station first information including channel assignment information of the active non-anchor base station when it is determined that the mobile station is to perform the soft handover, and when there are signals to be transmitted to the mobile station from the active non-anchor base station; transmitting by the active non-anchor base station second information including channel assignment information of the anchor base station when it is determined that the mobile station is to perform the soft handover, and when there are signals to be transmitted to the mobile station from the anchor base station; and receiving by the mobile station signals from the anchor base station and the active non-anchor base station corresponding to the first information and the second information when it is determined that the mobile station is to perform a soft handover.

According to still yet another aspect of the present invention, there is provided a system for performing a soft handover in a broadband wireless access communication system. The system comprises an anchor base station for transmitting first information including channel assignment information of an active non-anchor base station when it is determined that a mobile station is to perform a soft handover, and when there are signals to be transmitted to the mobile station from the active non-anchor base station; an active non-anchor base station for transmitting second information including channel assignment information of the anchor base station when it is determined that the mobile station is to perform a soft handover, and when there are signals to be transmitted to the mobile station from the anchor base station; and a mobile station for receiving signals from the anchor base station and the active non-anchor base station corresponding to the first information and the second information when it is determined that the mobile station is to perform the soft handover.

According to still yet another aspect of the present invention, there is provided a method for performing a soft handover in a broadband wireless access communication system which includes a mobile station, an anchor base station providing communication services to the mobile station, and an active non-anchor base station different from the anchor base station, the soft handover of the MS scheduled to be performed toward the active non-anchor base station. The method comprises the steps of receiving a first MAP information which is in the DL-MAP of active non-anchor base station and indicates at least one burst from anchor base station or receiving a second MAP information which is in the DL-MAP of the anchor base station and indicates at least one burst from active non-anchor base station considering downlink channel state.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention rather unclear.

The present invention proposes a system and a method for performing a soft handover in a broadband wireless access communication system (BWA) (e.g., an Institute of Electrical and Electronics Engineers (IEEE) 812.16e-based communication system). Particularly, the present invention proposes a system and a method in which an anchor base station (a serving base station) and an active non-anchor base station (a target base station) provide channel allocation information in order to perform a soft handover in the IEEE 812.16e-based communication system. Hereinafter, the serving base station and the target base station will be referred to as an anchor base station and an active non-anchor base station, respectively. According to the present invention, although the IEEE 812.16e-based communication system is described by way of example for the purpose of description, it is natural that other communication systems as well as the IEEE 812.16e-based communication system can be employed.

Figure 1:
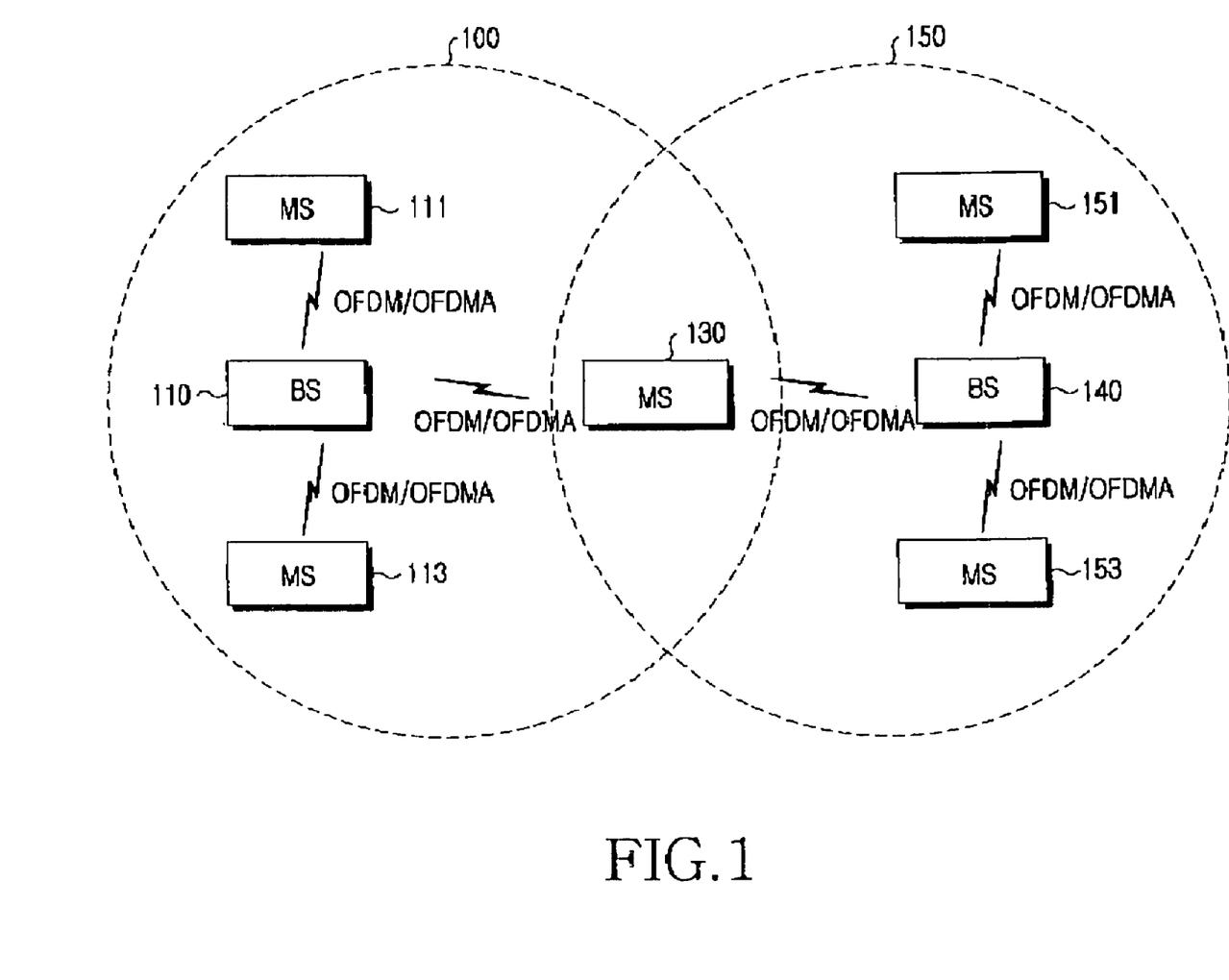
FIG. 1 is a block diagram illustrating the structure of an IEEE 812.16e-based communication system according to an embodiment of the present invention.

FIG. 1 is a block diagram illustrating a structure of an IEEE 812.16e-based communication system according to an embodiment of the present invention.

The IEEE 812.16e-based communication system having a multi-cell structure includes a cell 100, a cell 150, a base station 110 controlling the cell 100, a base station 140 controlling the cell 150, and a plurality of MSs 111, 113, 130, 151, and 153. Although one base station may control several cells, it is assumed that one base station controls only one cell for the purpose of description in the embodiment of the present invention. In addition, the base stations 110 and 140 transmit/receive signals to/from the MSs 111, 113, 130, 151, and 153 using the OFDM/OFDMA scheme. Herein, it is assumed that the base stations 110 and 140 have a multi-sector structure, sectors in the same cell use the same center-frequency, and adjacent sectors are assigned different sub-channels.

The above description deals with the structure of the IEEE 812.16e-based communication system according to an embodiment of the present invention with reference to FIG. 1, and, hereinafter, a sector structure in the IEEE 812.16e-based communication system according to an embodiment of the present invention will be described with reference to FIG. 2.

Figure 2:
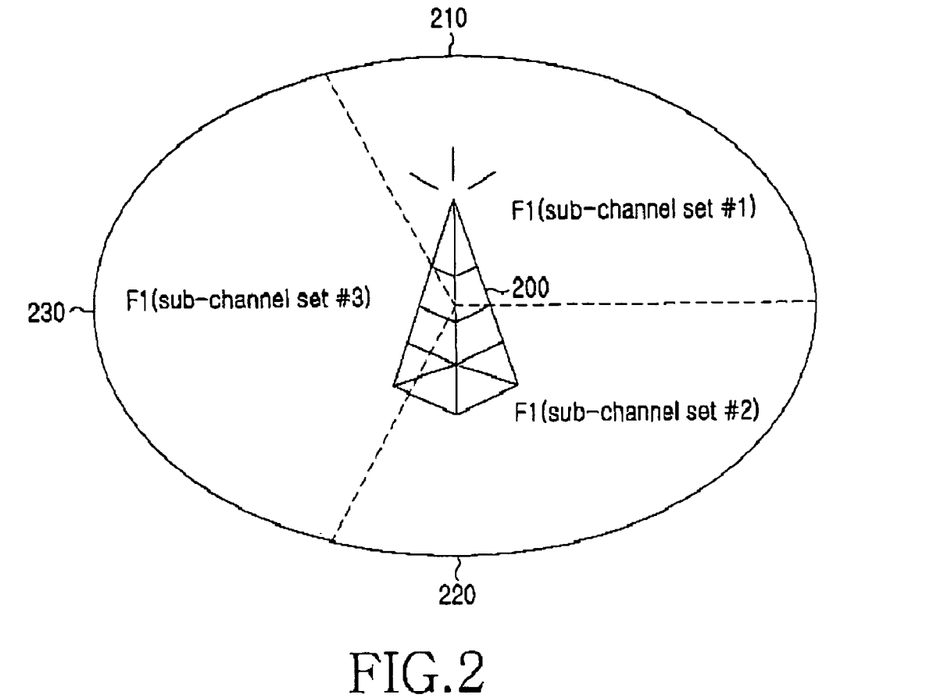
FIG. 2 is a block diagram illustrating the sector structure in an IEEE 802.16e-based communication system according to an embodiment of the present invention.

FIG. 2 is a block diagram illustrating the sector structure in the IEEE 812.16e-based communication system according to an embodiment of the present invention.

A cell controlled by a base station is divided into several sectors (e.g., three sectors; a first sector 210, a second sector 220, and a third sector 230). Each of the first sector 210 to the third sector 230 employs the same center-frequency of F1, and different sub-channels are used between them. In other words, the first sector 210 to the third sector 230 use mutually-different sub-channel sets as shown in FIG. 2. The first sector 210, the second sector 220, and the third sector 230 use the first sub-channel set, the second sub-channel set, and the third sub-channel set, respectively.

The above description deals with the sector structure in the IEEE 812.16e-based communication system according to an embodiment of the present invention with reference to FIG. 2, and, hereinafter, a frame structure in the IEEE 812.16e-based communication system according to an embodiment of the present invention will be described with reference to FIG. 3.

Figure 3:
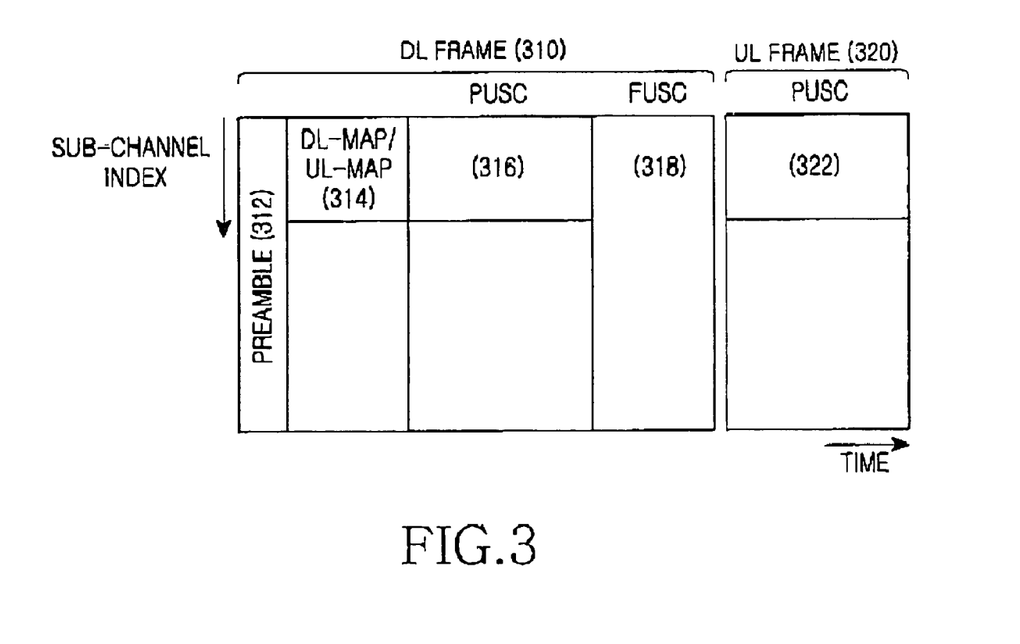
FIG. 3 is a block diagram illustrating the frame structure in an IEEE 802.16e-based communication system according to an embodiment of the present invention.

FIG. 3 is a block diagram illustrating the frame structure in the IEEE 812.16e-based communication system according to an embodiment of the present invention.

The frame structure in the IEEE 812.16e-based communication system includes a downlink (DL) frame 310 and an uplink (UL) frame 320. The DL frame 310 includes a preamble field 312, a DL-MAP/UL-MAP field 314, a PUSC (partial usage of sub-channels) field 316, and an FUSC (full usage of sub-channels) field 318. The UL frame 320 includes a PUSC field 322.

The preamble field 312 is a field used for transmitting a preamble sequence for synchronization between a base station and an MS. The DL-MAP/UL-MAP field 314 is a field used for transmitting a DL-MAP message and an UL-MAP message. The base station transmits the MAP message indicating a channel interval allocated to each MS before the channel interval, and the MS detects information included in the MAP message so as to recognize the channel interval and a coding scheme. Detailed descriptions of the DL-MAP message and the UL-MAP message will be given later. The PUSC field 316 is a field used for transmitting DL data burst through a PUSC scheme, and the FUSC field 318 is a field used for transmitting DL data burst through an FUSC scheme. In addition, the PUSC field 322 is a field used for transmitting UL data burst using a PUSC scheme.

Figure 4:
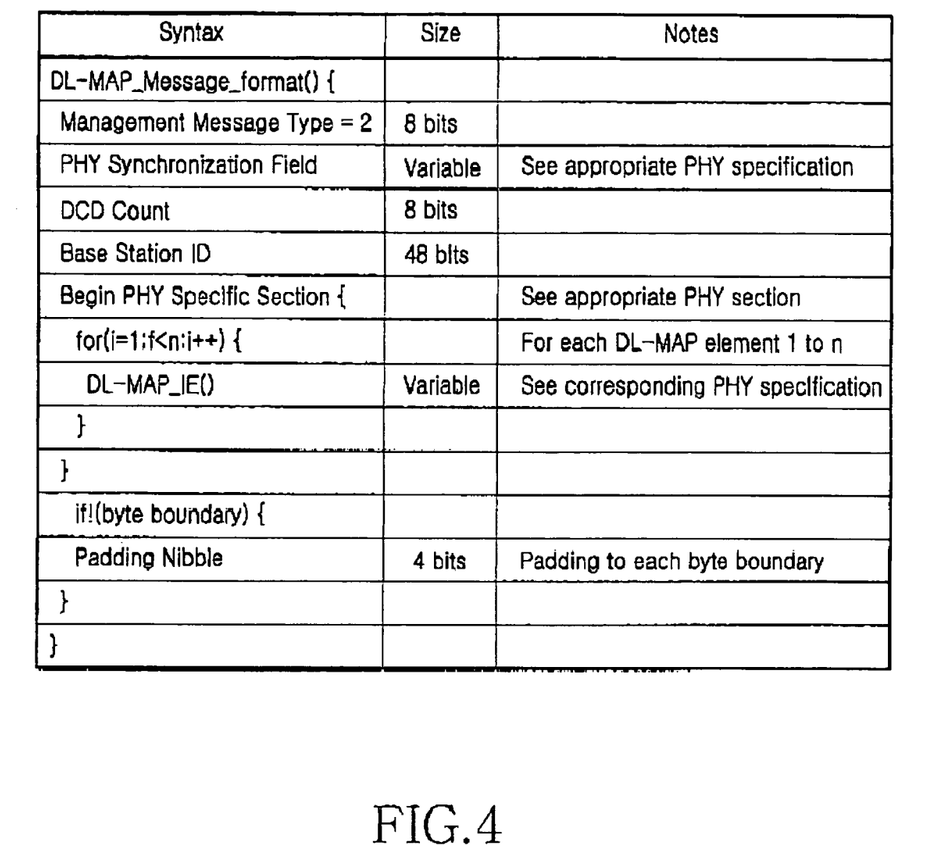
FIG. 4 illustrates the format of a DL-MAP message according to an embodiment of the present invention.

FIG. 4 illustrates the format of the DL-MAP message according to an embodiment of the present invention.

The DL-MAP message includes various information elements (IEs), i.e., 'Management Message Type' representing a type of a transmitted message, 'Physical (PHY) Synchronization' set corresponding to a modulation scheme or a de-modulation scheme applied to a physical channel in order to acquire synchronization, 'DCD count' representing a count value corresponding to the configuration change of a downlink channel descriptor message including downlink burst profile, 'Base Station ID' representing a base station identifier, and n number of DL-MAP IEs. The DL-MAP message includes information of raging codes assigned for raging.

Figure 5:
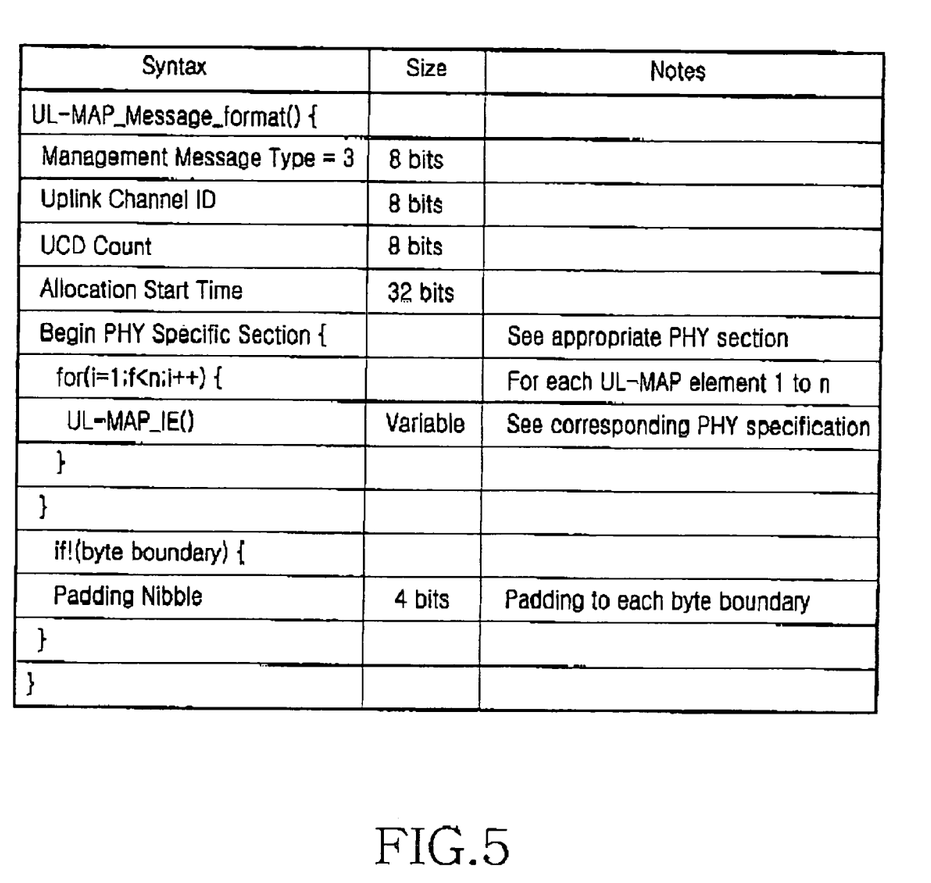
FIG. 5 illustrates the format of a UL-MAP message according to an embodiment of the present invention.

FIG. 5 illustrates the form of the UL-MAP message according to an embodiment of the present invention.

The UL-MAP message includes various IEs, i.e. 'Management Message Type' representing a type of a transmitted message, 'Uplink Channel ID' representing a used uplink channel identifier, 'UCD count' representing a count value corresponding to the configuration change of an uplink channel descript message including uplink burst profile, 'Allocation Start Time' representing information regarding start time to allocate uplink resources, and n number of UL-MAP IEs. The Uplink Channel ID is assigned as a unique value in a Medium Access Control (MAC)-sub layer.

A data burst field of the DL-frame 310 shown in FIG. 3 includes time slots assigned according to MSs through a Time Division Multiplexing (TDM)/Time Division Multiple Access (TDMA) scheme. A base station broadcasts control information to MSs (receiving services from the base station) through the DL-MAP/UP-MAP field 314 by using a preset center-frequency.

As each of the MSs is powered on, each MS detects a reference signal having the maximum size (e.g., the maximum Carrier to Interference and Noise Ratio (CINR)) by monitoring all of the frequency bands preset in each MS. Herein, the reference signal may include a pilot signal. Each MS determines a base station having transmitted the reference signal having the highest CINR as a base station controlling the MS, analyzes a DL-MAP message and an UL-MAP message in the DL-MAP/UL-MAP field 314 of the DL frame 310 transmitted from the base station so as to determine channel allocation information indicating the interval at which real data burst and control information controlling the DL and the UL of the MS are transmitted/received, and transmits/receives data burst at the corresponding data burst transmit/receive interval.

An IEEE 812.16e communication system in which one base station uses one center frequency and a plurality of sectors within the base station use as many sub-bands as the sectors divided from a frequency band corresponding to the center frequency will now be described. In such an IEEE 812.16e communication system, when an MS moves from a current anchor base station to another base station (an active non-anchor base station), or the MS moves from an anchor sector (a serving sector) to another sector (an active non-anchor sector; a target sector) within the same anchor base station, the MS must perform a handover. In particular, according to an embodiment of the present invention, the MS must perform a soft handover. In order to perform the soft handover described above, an MS must obtain channel allocation information of both an anchor base station (an anchor sector in the case of handover between sectors) and an active non-anchor base station (an active non-anchor sector in the case of handover between sectors). Herein, the channel allocation information is included in MAP messages transmitted to the MS (requesting soft handover) from the anchor base station or the non-anchor base station. In other words, all of the base stations of the IEEE 812.16e communication system broadcast channel allocation information of their neighboring base stations through the MAP messages.

In the conventional IEEE 812.16e communication system, an anchor base station inserts the MAP IEs (including channel allocation information for data burst to be transmitted/received to/from an MS) into a MAP message to be transmitted, and the MS transmits/receives data burst through a UL/DL corresponding to the channel allocation information included in the MAP IEs. However, according to an embodiment of the present invention, the MS must receive channel allocation information from the anchor base station and the non-anchor base station so that the MS may simultaneously transmit/receive the same data burst from both the anchor base station and the non-anchor base station in an MS handover area. In particular, according to an embodiment of the present invention, it is possible to obtain a soft combining gain by decoding and buffering data burst from the anchor base station and the non-anchor base station having the same data burst without taking into consideration a soft combining scheme employing the same permulation, the same symbol, and the same sub-channel in a physical layer.

Hereinafter, further description about the MAP IEs for the soft handover newly proposed in the present invention will be given.

In the conventional IEEE 802.16e communication system, it is impossible for an MS to simultaneously receive the MAP IEs from two or more base stations. Accordingly, in an IEEE 812.16e communication system according to an embodiment of the present invention, an anchor base station and an active non-anchor base station insert the MAP IEs including channel allocation information of both the anchor base station and the non-anchor base station for the MS into their own MAP messages. Then, the MS receives the MAP IEs from one of the anchor base station and the non-anchor base station, obtains channel information regarding both the anchor base station and the non-anchor base station from the MAP IEs, and transmits/receives data burst from/to the anchor base station and the non-anchor base station corresponding to the obtained channel information. Hereinafter, a detailed description about the MAP IEs proposed in the present invention will be given.

(1) A Handover Anchor Active MAP IE ('HO Anchor Active MAP IE').

The HO Anchor Active MAP IE is a MAP IE transmitted from an active non-anchor base station that includes channel allocation information of a DL or a UL of an anchor base station and indicates that there is data burst transmitted from an anchor base station. The HO Anchor Active MAP IE including the channel assignment information of the DL of the anchor base station corresponds to a HO Anchor Active DL MAP IE, and the HO Anchor Active MAP IE including the channel assignment information of the UL of the anchor base station corresponds to a HO Anchor Active UL MAP IE.

(2) A Handover MAP IE in a Non-Anchor Base Station ('HO MAP IE in Non-Anchor BS').

The HO MAP IE in non-anchor BS is a MAP IE transmitted from an anchor base station that includes the channel allocation information of a DL or a UL of an active non-anchor base station and indicates that there is data burst transmitted from the non-anchor base station. The HO MAP IE in non-anchor BS including the channel assignment information of the DL of the non-anchor base station corresponds to 'HO DL MAP IE in non-anchor BS', and the HO MAP IE in non-anchor BS including the channel assignment information of the UL of the non-anchor base station corresponds to 'HO UL MAP IE in non-anchor BS'.

(3) A Handover Connection Identifier Translation MAP IE ('HO CID Translation MAP IE')

The HO CID Translation MAP IE is a MAP IE transmitted from an active non-anchor base station and is transmitted in order to map a CID of a MS allocated by an anchor base station with a CID of the MS allocated by an active non-anchor base station. In addition, the HO CID Translation MAP IE represents that there is data burst transmitted from the non-anchor base station.

Figure 6:
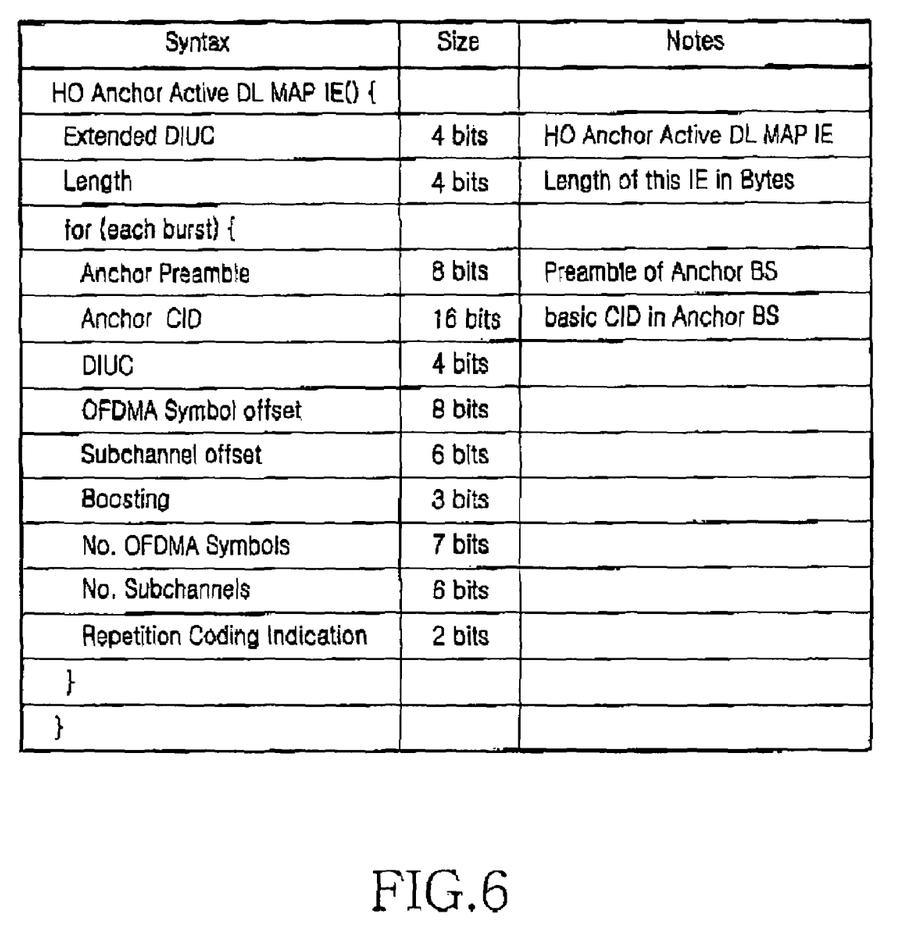
FIG. 6 illustrates the format of an HO Anchor Active DL MAP IE according to an embodiment of the present invention.

FIG. 6 illustrates the format of the HO Anchor Active DL MAP IE according to an embodiment of the present invention.

The HO Anchor Active DL MAP IE includes 'Extended DIUC'(Downlink Interval Usage Code) field used for distinguishing a plurality of IEs (i.e., the HO Anchor Active DL MAP IE), 'Length' indicating the length of the HO Anchor Active DL MAP IE, and IEs for each data burst. As shown in FIG. 6, the IEs for each data burst include 'Anchor Preamble' representing a preamble of the anchor base station, 'Anchor CID' representing a basic CID assigned to a corresponding MS in the anchor base station, 'DIUC', 'OFDMA Symbol offset' indicating a starting point of a symbol representing assigned data burst, 'Subchannel offset' indicating a starting point of a sub-channel representing assigned data burst, 'Boosting' representing if transmission power of a sub-carrier for the assigned data burst is boosted, 'No. OFDMA Symbol' representing the number of symbols of the assigned data burst, 'No. Subchannels' representing the number of sub-channels of the assigned data burst, and 'Repetition Coding Indication' representing a repetition code used for the assigned data burst.

Figure 7:
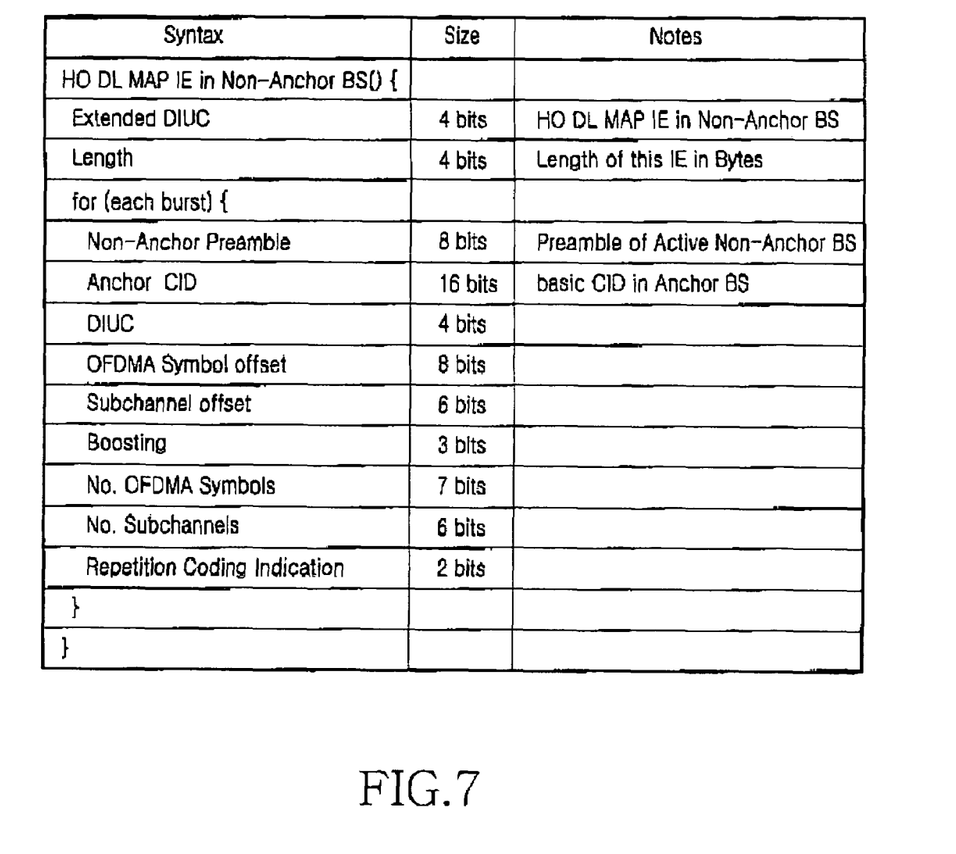
FIG. 7 illustrates the format of an HO DL MAP IE in non-anchor BS according to an embodiment of the present invention.

FIG. 7 illustrates the format of the HO DL MAP IE in non-anchor BS according to an embodiment of the present invention.

The HO DL MAP IE in non-anchor BS includes 'Extended DIUC (Downlink Interval Usage Code)' used for distinguishing a plurality of the IEs (i.e., the HO DL MAP IE in non-anchor BS), 'Length' indicating the length of the HO DL MAP IE in non-anchor BS, and IEs for each data burst. As shown in FIG. 7, the IEs for each data burst include 'Non-Anchor Preamble' representing a preamble of the active non-anchor base station, 'Anchor CID' representing a basic CID assigned to a corresponding MS in the anchor base station, 'DIUC', 'OFDMA Symbol offset' indicating a starting point of a symbol representing assigned data burst, 'Subchannel offset' indicating a starting point of a sub-channel used for the assigned data burst, 'Boosting' representing if transmission power of a sub-carrier for the assigned data burst is boosted, 'No. OFDMA Symbol' representing the number of symbols of the assigned data burst, 'No. Subchannels' representing the number of sub-channels of the assigned data burst, and 'Repetition Coding Indication' representing a repetition code used for the assigned data burst.

Figure 8:
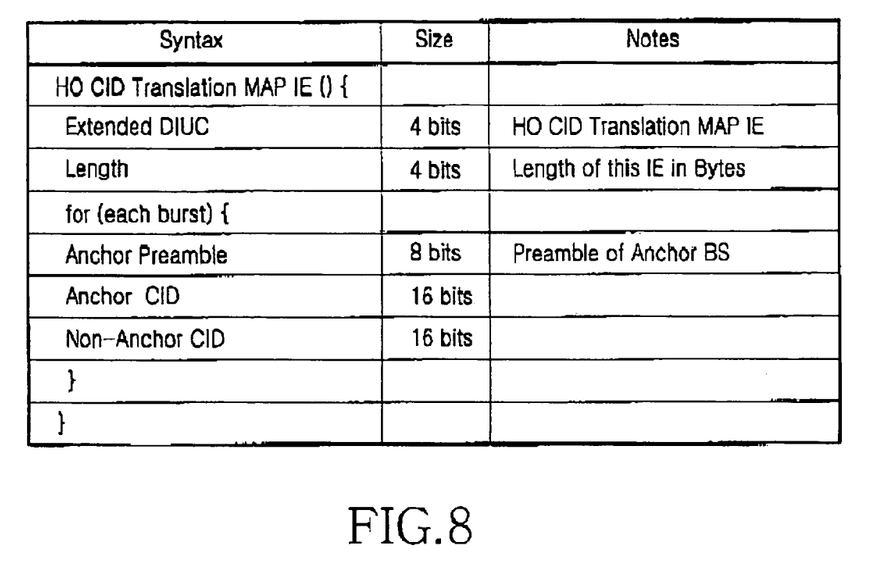
FIG. 8 illustrates the format of an HO CID Translation MAP IE according to an embodiment of the present invention.

FIG. 8 illustrates a format of the HO CID Translation MAP IE according to an embodiment of the present invention.

The HO CID Translation MAP IE includes 'Extended DIUC (Downlink Interval Usage Code)' used for distinguishing a plurality of the IEs (i.e., the HO CID Translation MAP IE), 'Length' indicating the length of the HO CID Translation MAP IE, and IEs for each data burst. As shown in FIG. 8, the IEs for each data burst include 'Anchor Preamble' representing a preamble of the anchor base station, 'Anchor CID' representing a basic CID assigned to a corresponding MS in the anchor base station, and 'Non-Anchor CID' representing a basic CID temporally used to represent the channel assignment information for the data burst to be transmitted to a corresponding MS in a DL or a UL of the active non-anchor base station.

In other words, in an active non-anchor base station, an MS that is performing a soft handover confirms the HO CID Translation MAP IE, recognizes the preamble of an anchor base station and 'Non-Anchor CID' mapped with 'Anchor CID', and receives data burst transmitted from the active non-anchor base station using the Non-anchor CID assigned to the MS. It is necessary to insert the Anchor Preamble into the HO CID Translation MAP IE because the MSs performing soft handover in the active non-anchor base station may have different anchor base stations. In addition, the anchor base stations may have the same Anchor CIDs. In this case, the Anchor Preamble may be used to distinguish the MSs connected to different anchor base stations. In addition, the MS performing a soft handover must decode the HO CID Translation MAP IE in every frame in order to transmit/receive data burst to/from the active non-anchor base station because the Non-Anchor CID of the active non-anchor base station may be changed in every frame.

Figure 9:
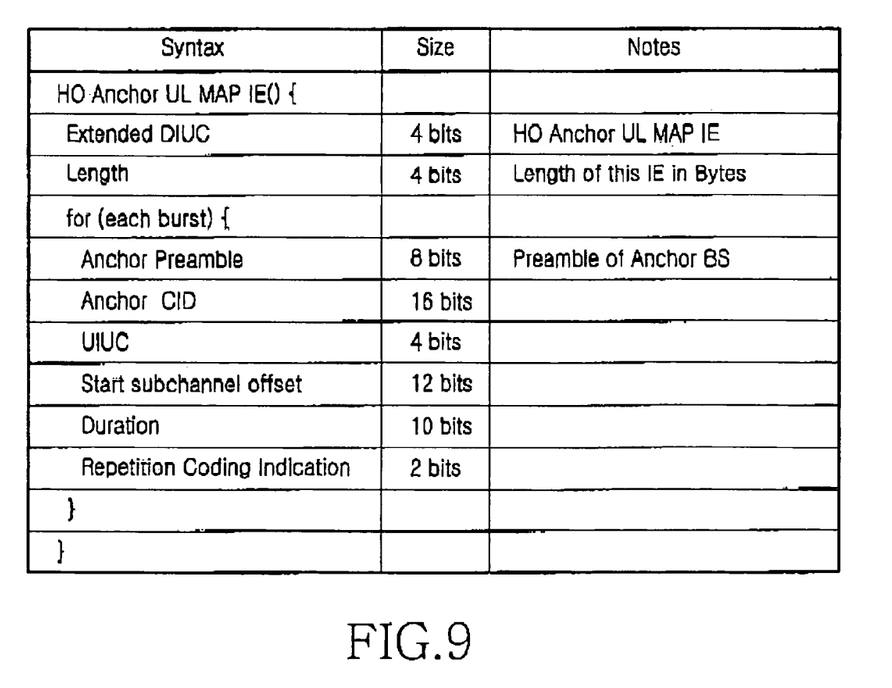
FIG. 9 illustrates the format of an HO Anchor Active UL MAP IE according to an embodiment of the present invention.

FIG. 9 illustrates the format of the HO Anchor Active UL MAP IE according to an embodiment of the present invention. The HO Anchor Active UL MAP E includes 'Extended UIUC (Uplink Interval Usage Code)' used for distinguishing a plurality of the IEs (i.e., the HO Anchor Active UL MAP IE), 'Length' indicating the length of the HO Anchor Active UL MAP IE, and IEs for each data burst. As shown in FIG. 9, the IEs for each data burst include 'Anchor Preamble' representing a preamble of the anchor base station, 'Anchor CID' representing a basic CID assigned to a corresponding MS in the anchor base station, 'UIUC' representing an uplink interval usage code, 'Start Subchannel offset' indicating a starting point of a sub-channel representing assigned data burst, 'Duration' indicating the amount of resource in OFDMA slot, and 'Repetition Coding Indication' representing a repetition code used for the assigned data burst.

Figure 10:
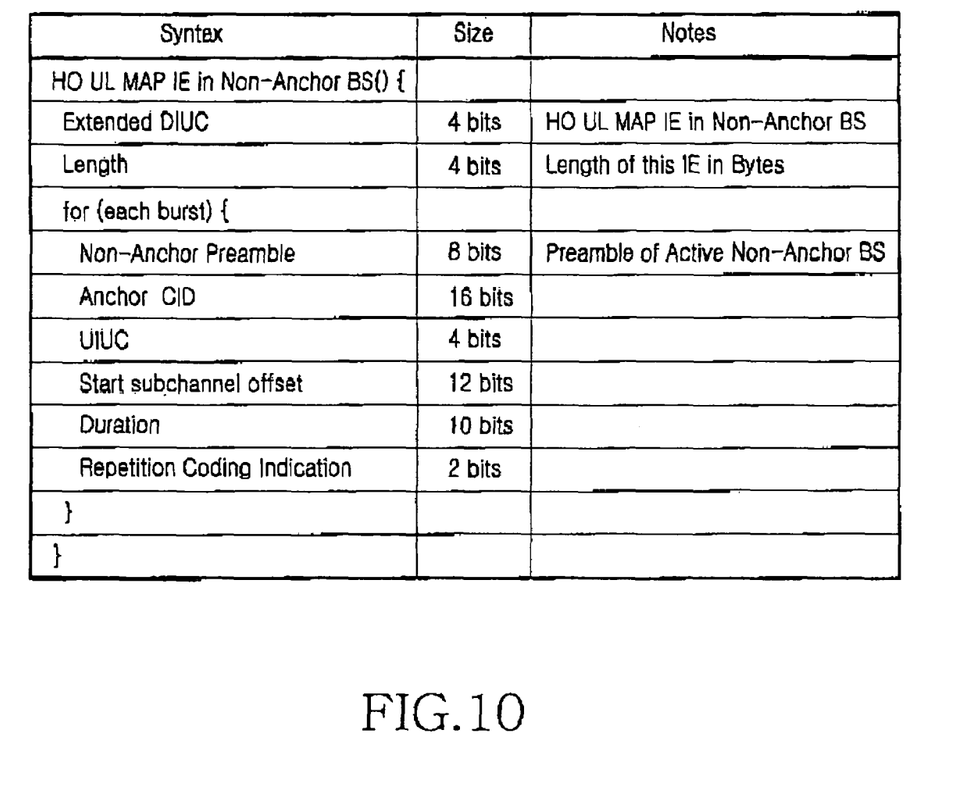
FIG. 10 illustrates the format of an HO UL MAP IE in non-anchor BS according to embodiment of the present invention.

FIG. 10 illustrates the format of the HO UL MAP IE in non-anchor BS according to an embodiment of the present invention.

The HO UL MAP IE in non-anchor BS includes 'Extended UIUC used for distinguishing a plurality of the IEs (i.e. the HO UL MAP IE in non-anchor BS), 'Length' indicating the length of the HO UL MAP IE in non-anchor BS, and IEs for each data burst. As shown in FIG. 10, the IEs for each data burst include 'Non-Anchor Preamble' representing a preamble of the active non-anchor base station, 'Anchor CID' representing a basic CID assigned to a corresponding MS in the anchor base station, 'UIUC', 'Start Subchannel offset' indicating a starting point of a sub-channel representing the assigned data burst, 'Duration' indicating the amount of resource in OFDMA, and 'Repetition Coding Indication' representing a repetition code used for the assigned data burst.

Figure 11:
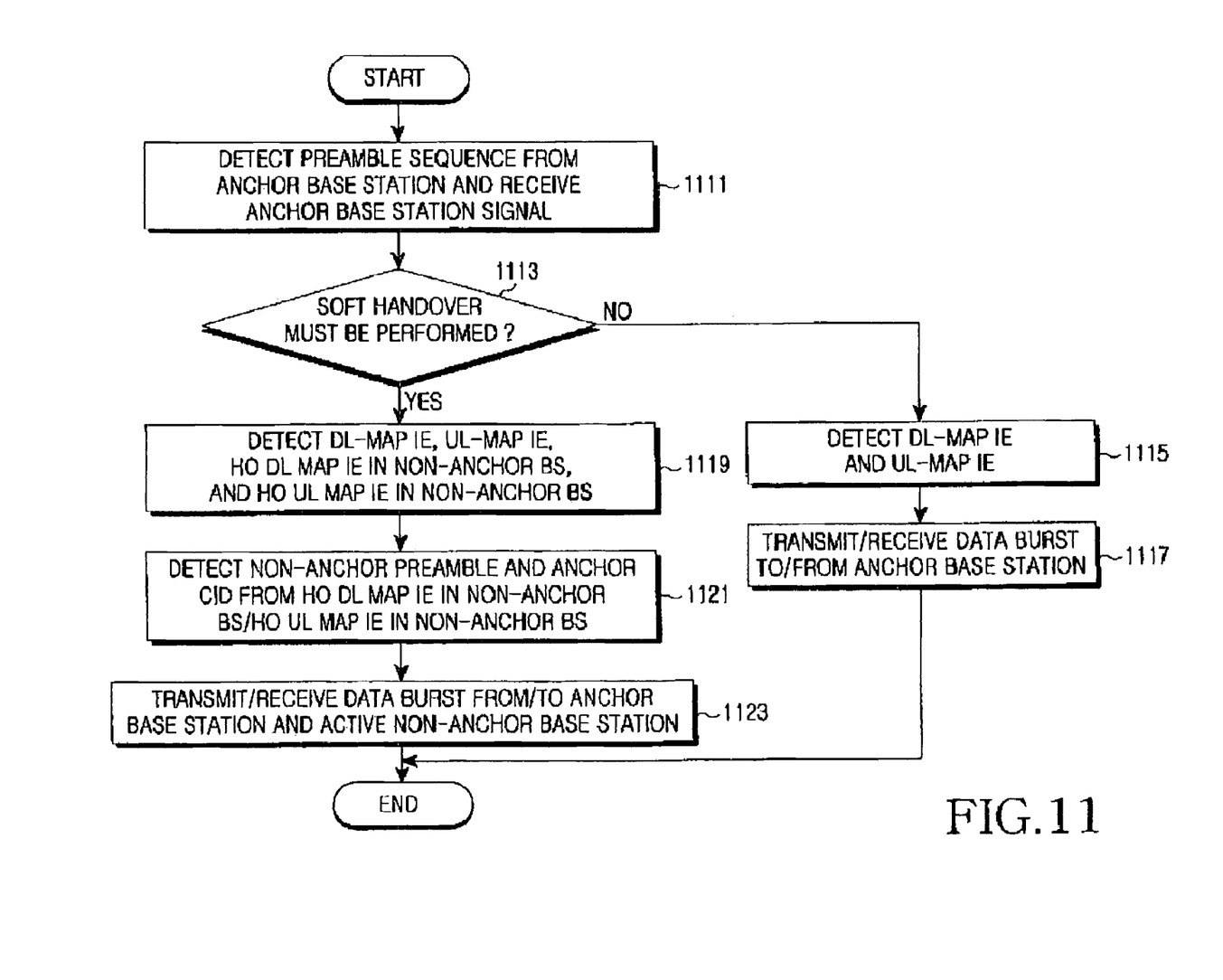
FIG. 11 is a flowchart illustrating the operation of an MS performing soft handover by receiving channel assignment information from an anchor base station according to an embodiment of the present invention.

FIG. 11 is a flowchart illustrating the operation of the MS performing a soft handover by receiving channel assignment information from an anchor base station according to an embodiment of the present invention.

The MS detects a preamble sequence from the anchor base station so as to obtain synchronization with the anchor base station in step 1111. In step 1113, the MS determines if it necessary to perform a soft handover between an anchor base station and another base station (i.e. an active non-anchor base station). If it is not necessary for the MS to perform the soft handover, the MS performs step 1115, wherein the MS demodulates and decodes typical MAP messages (MAP messages used for the conventional IEEE 812.16e communication system) so as to detect DL-MAP IEs and UL-MAP IEs. In step 1117, the MS transmits/receives data burst corresponding to the DL-MAP IE and the UL-MAP IE detected from the anchor base station and then terminates the operation of performing the soft handover.

If the MS must perform a soft handover as the determination result in step 1113, the MS performs step 1119, wherein the MS demodulates and decodes MAP messages so as to detect the DL-MAP IE, the UL-MAP IE, the HO DL MAP IE in non-anchor BS, and the HO UL MAP IE in non-anchor BS because the MS must perform the soft handover. In step 1121, the MS detects the Non-Anchor Preamble and the Anchor CID included in the detected HO DL MAP in non-anchor BS and the detected HO UL MAP IE in non-anchor BS. It is necessary to detect the Non-Anchor preamble and the Anchor CID so that the MS may distinguish data burst transmitted/received from/to the active non-anchor base station as described above.

In step 1123, the MS transmits/receives data burst from/to the anchor base station and the active non-anchor base station correspondingly to the detected DL-MAP IE, the UL-MAP IE, the HO DL MAP IE in non-anchor BS, and the HO UL MAP in non-anchor BS and then terminates the operation of performing the soft handover.

Figure 12:
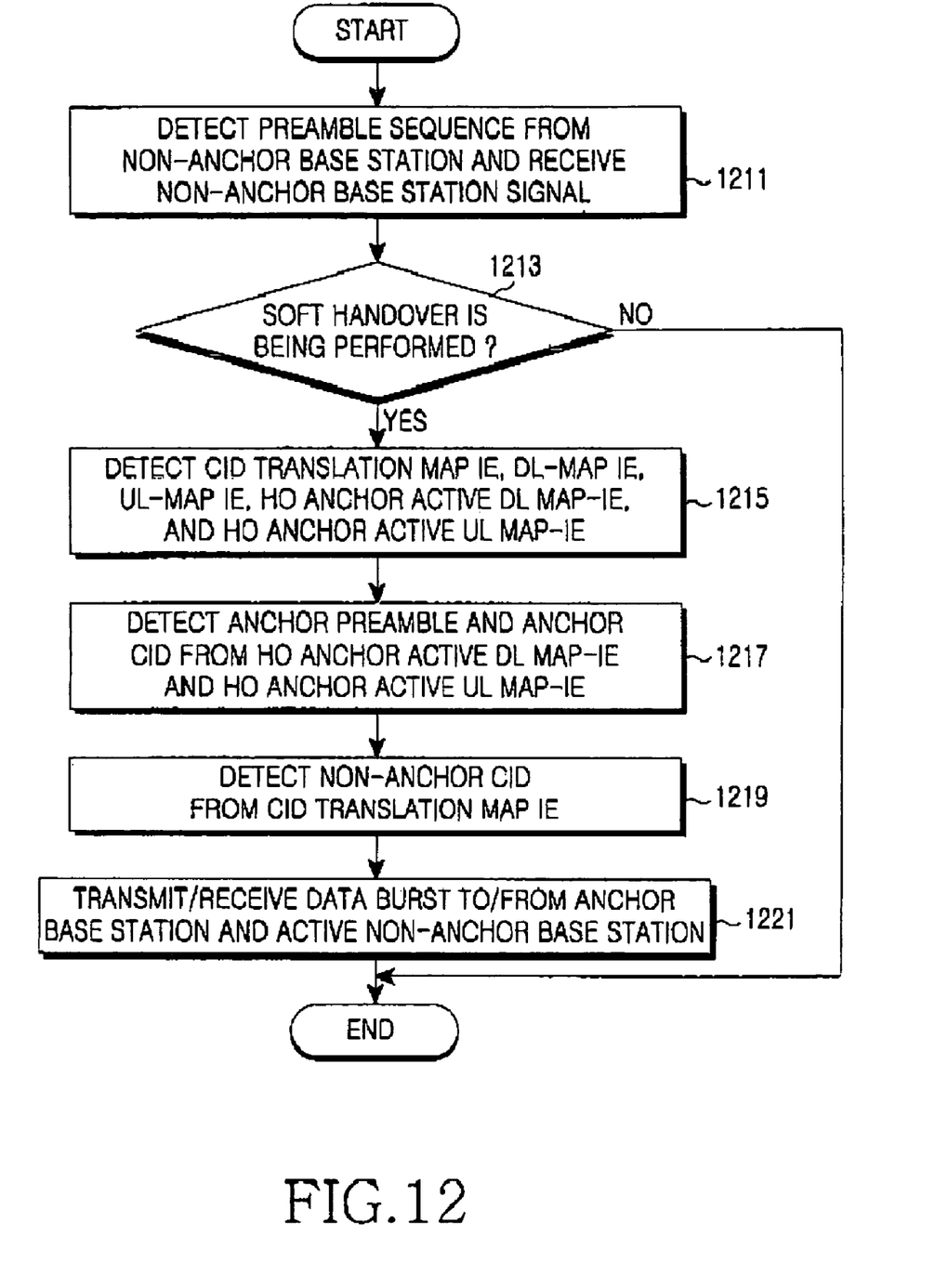
FIG. 12 is a flowchart illustrating the operation of an MS performing soft handover by receiving channel assignment information from an active non-anchor base station according to an embodiment of the present invention.

FIG. 12 is a flowchart illustrating the operation of an MS performing soft handover by receiving channel assignment information from an active non-anchor base station according to one embodiment of the present invention.

The MS detects a preamble sequence from the active non-anchor base station so as to obtain synchronization with the active non-anchor base station in step 1211. The MS determines if a soft handover operation is currently performed in step 1213. If the soft handover operation is being performed, the MS demodulates and decodes MAP messages so as to detect the HO CID Translation MAP IE, the DL-MAP IE, the UL-MAP IE, the HO Anchor Active DL MAP IE, and the HO Anchor Active UL MAP IE in step 1215. In step 1217, the MS detects 'Anchor Preamble' and 'Anchor CID' included in the HO Anchor Active DL MAP IE and the HO Anchor Active UL MAP IE. It is necessary to detect the Anchor preamble and the Anchor CID so that the MS may distinguish data burst transmitted/received from/to the anchor base station as described above. However, if the active non-anchor base station uses a CID identical to the Anchor CID used in the anchor base station, it is impossible for the MS to transmit/receive data burst from/to the anchor base station because CIDs are intrinsically assigned according to base stations.

Accordingly, in step 1219, the MS detects the Non-Anchor CID based on the detected HO CID Translation MAP IE. As a result, the MS detects the Non-Anchor CID from the anchor base station, so that the MS can transmit/receive data burst having Anchor CID corresponding to the Non-Anchor CID. In step 1221, the MS transmits/receives data burst from/to both the anchor base station and the active non-anchor base station correspondingly to the detected HO CID Translation MAP IE, the DL-MAP IE, the UL-MAP IE, the HO Anchor Active DL MAP IE, and the HO Anchor Active UL MAP IE, and then terminates the operation of performing soft handover.

As described above, according to the present invention, new MAP IEs are embodied in the IEEE 812.16e-based communication system, thereby enabling soft handover of the MS. As a result, the soft handover of the MS improves signal receiving quality of the MS and removes the ping-pong phenomenon caused in had handover, thereby improving the performance of an entire system.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for performing a soft handover in a broadband wireless access communication system which includes a mobile station, an anchor base station providing communication services to the mobile station, and an active non-anchor base station different from the anchor base station, the soft handover of the mobile station scheduled to be performed toward the active non-anchor base station, the method comprising the steps of:

receiving one of first information, second information, and third information, when a determination is made that the mobile station is to perform the soft handover, wherein the first information, received from the anchor base station, includes channel assignment information of the active non-anchor base station, the second information, received from the active non-anchor base station, includes channel assignment information of the anchor base station, the third information, received from the active non-anchor base station, represents a relationship between a connection identifier of the mobile station used in the anchor base station and a connection identifier used in the active non-anchor base station; and receiving a signal corresponding to the received information.

2. The method as claimed in claim 1, wherein receiving the signal corresponding to the received information comprises:

receiving the signal from the active non-anchor base station, if the information is the first information;

receiving the signal from the anchor base station, if the information is the second information; and receiving the signal from the active non-anchor base station, if the information is the third information.

3. The method as claimed in claim 1, wherein the first information includes reference signal information and a connection identifier used in the anchor base station, the reference signal information indicating a reference signal used in the active non-anchor base station.

4. The method as claimed in claim 1, wherein the second information includes reference signal information and a connection identifier used in the anchor base station, the reference signal information indicating a reference signal used in the anchor base station.

5. The method as claimed in claim 1, wherein the third information includes reference signal information indicating a reference signal used in the anchor base station, a connection identifier used in the anchor base station, and a connection identifier used in the active non-anchor base station.

6. The method as claimed in claim 5, wherein the connection identifier used in the active non-anchor base station is mapped with the connection identifier used in the anchor base station when the connection identifier used in the active non-anchor base station is used in the anchor base station.

7. A method for performing a soft handover in a broadband wireless access communication system which includes a mobile station, an anchor base station providing communication services to the mobile station, and an active non-anchor base station different from the anchor base station, the soft handover of the mobile station scheduled to be performed toward the active non-anchor base station, the method comprising the steps of:

determining if there is a signal to be transmitted to the mobile station from the active non-anchor base station when a determination is made that the mobile station is to perform a soft handover; and transmitting information including channel assignment information of the active non-anchor base station when a determination is made that there is signal to be transmitted to the mobile station from the active non-anchor base station.

8. The method as claimed in claim 7, wherein the information includes reference signal information indicating a reference signal used in the active non-anchor base station and a connection identifier used in the anchor base station.

9. A method for performing a soft handover in a broadband wireless access communication system which includes a mobile station, an anchor base station providing communication services to the mobile station, and an active non-anchor base station different from the anchor base station, the soft handover of the mobile station scheduled to be performed toward the active non-anchor base station, the method comprising the steps of:

determining if there is a signal to be transmitted to the mobile station from the anchor base station when a determination is made that the mobile station is to perform a soft handover; and transmitting one of first information and second information, wherein the first information includes channel assignment information of the anchor base station, and wherein the second information includes information representing a relationship between a connection identifier of the mobile station used in the anchor base station and a connection identifier used in the active non-anchor base station, wherein transmitting one of first information and second information further includes:

transmitting the first information when a determination is made that there is a signal to be transmitted to the mobile station from the anchor base station; and transmitting the second information when a determination is made that there is a signal to be transmitted to the mobile station from the active non-anchor base station.

10. The method as claimed in claim 9, wherein the first information includes reference signal information indicating a reference signal used in the active non-anchor base station and a connection identifier used in the anchor base station.

11. The method as claimed in claim 9, wherein the second information includes reference signal information indicating a reference signal used in the anchor base station, a connection identifier used in the anchor base station, and a connection identifier used in the active non-anchor base station.

12. The method as claimed in claim 11, wherein the connection identifier used in the active non-anchor base station is mapped with the connection identifier used in the anchor base station when the connection identifier used in the active non-anchor base station is used in the anchor base station.

13. A method for performing a soft handover in a broadband wireless access communication system which includes a mobile station, an anchor base station providing communication services to the mobile station, and an active non-anchor base station different from the anchor base station, the soft handover of the mobile station scheduled to be performed toward the active non-anchor base station, the method comprising the steps of:

transmitting by the anchor base station first information including channel assignment information of the active non-anchor base station when a determination is made that the mobile station is to perform the soft handover, and when there are signals to be transmitted to the mobile station from the active non-anchor base station;

transmitting by the active non-anchor base station one of second information and third information, wherein the second information includes channel assignment information of the anchor base station, and wherein the third information represents a relationship between a connection identifier of the mobile station used in the anchor base station and a connection identifier used in the active non-anchor base station, when a determination is made that the mobile station is to perform the soft handover, wherein transmitting one of second information and third information comprises:

transmitting the second information when a determination is made that there is a signal to be transmitted to the mobile station from the anchor base station; and transmitting the third information when a determination is made that there is a signal to be transmitted to the mobile station from the active non-anchor base station;

receiving by the mobile station one of the first information, second information and third second information when a determination is made that the mobile station is to perform a soft handover; and receiving, by the mobile station, a signal corresponding to the received information.

14. The method as claimed in claim 13, wherein receiving, by the mobile station, the signal corresponding to the received information further comprises:

receiving, by the mobile station, a signal from the active non-anchor base station, if the information is the first information;

receiving, by the mobile station, a signal from the anchor base station, if the information is the second information; and receiving, by the mobile station, a signal from the active non-anchor base station, if the information is the third information.

15. The method as claimed in claim 13, wherein the first information includes reference signal information indicating a reference signal used in the active non-anchor base station and a connection identifier used in the anchor base station.

16. The method as claimed in claim 13, wherein the second information includes reference signal information indicating a reference signal used in the anchor base station and a connection identifier used in the anchor base station.

17. The method as claimed in claim 13, wherein the third information includes reference signal information indicating a reference signal used in the anchor base station, a connection identifier used in the anchor base station, and a connection identifier used in the active non-anchor base station.

18. The method as claimed in claim 17, wherein the connection identifier used in the non-anchor base station is mapped with the connection identifier used in the anchor base station when the connection identifier used in the active non-anchor base station is used in the anchor base station.

19. A system for performing a soft handover in a broadband wireless access communication system, the system comprising:

an anchor base station for transmitting first information including channel assignment information of an active non-anchor base station when a determination is made that a mobile station is to perform a soft handover, and when there are signals to be transmitted to the mobile station from the active non-anchor base station;

an active non-anchor base station for transmitting one of second information and third information when a determination is made that the mobile station is to perform a soft handover, wherein the second information includes channel assignment information of the anchor base station, and wherein the third information represents a relationship between a connection identifier of the mobile station used in the anchor base station and a connection identifier used in the active non-anchor base station; and a mobile station for receiving one of the first information, the second information and the third information when a determination is made that the mobile station is to perform the soft handover, receiving a signal corresponding to the received information.

20. The system as claimed in claim 19, wherein the active non-anchor base station transmits the first information when a determination is made that there is a signal to be transmitted to the mobile station from the anchor base station, and transmits the second information when a determination is made that there is a signal to be transmitted to the mobile station from the active non-anchor base station; and wherein the mobile station receives a signal from the active non-anchor base station if the information is the first information, receives a signal from the anchor base station if the information is the second information, and receives a signal from the active non-anchor base station if the information is the third information.

21. The system as claimed in claim 19, wherein the first information includes reference signal information indicating a reference signal used in the active non-anchor base station and a connection identifier used in the anchor base station.

22. The system as claimed in claim 19, wherein the second information includes reference signal information indicating a reference signal used in the anchor base station and a connection identifier used in the anchor base station.

23. The system as claimed in claim 19, wherein the third information includes reference signal information indicating a reference signal used in the anchor base station, a connection identifier used in the anchor base station, and a connection identifier used in the active non-anchor base station.

24. The system as claimed in claim 23, wherein the connection identifier used in the active non-anchor base station is mapped with the connection identifier used in the anchor base station when the connection identifier used in the active non-anchor base station is used in the anchor base station.

* * * * *